United States Patent
Sugimoto

(10) Patent No.: US 7,337,105 B2
(45) Date of Patent: Feb. 26, 2008

(54) ELECTRONIC EQUIPMENT SETTING INFORMATION CREATING METHOD AND APPARATUS, AND SECURITY POLICY CREATING METHOD AND ASSOCIATED APPARATUS

(75) Inventor: Takahiro Sugimoto, Chuou-ku (JP)

(73) Assignee: Asgent, Inc., Tokyo (JP)

( * ) Notice: Subject to any disclaimer, the term of this patent is extended or adjusted under 35 U.S.C. 154(b) by 832 days.

(21) Appl. No.: 10/251,843

(22) Filed: Sep. 23, 2002

(65) Prior Publication Data

US 2003/0083877 A1 May 1, 2003

(30) Foreign Application Priority Data

Oct. 31, 2001 (JP) ............................... 2001-333817

(51) Int. Cl.
*G06F 17/27* (2006.01)
*G06F 17/20* (2006.01)
*H04L 9/00* (2006.01)

(52) U.S. Cl. ................................ 704/9; 704/1; 726/1
(58) Field of Classification Search .................... 704/9, 704/1; 726/1
See application file for complete search history.

(56) References Cited

U.S. PATENT DOCUMENTS

| | | | |
|---|---|---|---|
| 5,305,456 A | | 4/1994 | Boitana |
| 6,173,441 B1* | | 1/2001 | Klein .......................... 717/142 |
| 6,374,079 B1* | | 4/2002 | Hsu .......................... 455/11.1 |
| 2002/0013694 A1 | | 1/2002 | Murata et al. |
| 2002/0194223 A1* | | 12/2002 | Meyers et al. ............... 707/513 |

FOREIGN PATENT DOCUMENTS

| | | |
|---|---|---|
| WO | WO 00/11576 | 3/2000 |
| WO | WO 00/29978 | 5/2000 |
| WO | WO 00/30345 | 5/2000 |

OTHER PUBLICATIONS

K. Oguma et al.; "Applying the POLICYCOMPUTING Architecture to Information Exchange", IEICE Technical Report, vol. 100, No. 213, pp. 195-202, Jul. 18, 2000 ISEC2000-23~57 Information Security; with partial translation.
T. Baba; "Mastering Ipsec primary edition", first edition, O'Reilly Japan, Oct. 25, 2001, p. 307; with partial translation.
U.S. Appl. No. 09/853,708, filed May 14, 2001, Sugimoto.
"Guidelines for IT Security Policy", Jul. 18, 2000.
Alfred Avo et al.; "Compilers"; Principles, Techniques, and Tools; Addison-Wesley Publishing Company; 1986.

* cited by examiner

*Primary Examiner*—Tālivaldis Ivars Šmits
(74) *Attorney, Agent, or Firm*—Oliff & Berridge, PLC

(57) ABSTRACT

A method and an associated apparatus for automatically creating security policies written in specific languages of specific devices based on a security policy written in natural language. A product level policy creating apparatus comprises language conversion means and a plurality of specific device script creating means. The language conversion means converts a product level policy of a first level into an interface language. The specific device script creating means creates product level policies of a second level for the corresponding specific devices. Defining this interface language is synonymous with defining an API (Application Programming Interface). Since the API is defined thus, plug-in modules for functioning as the specific device script creating means can be easily created based on the API.

9 Claims, 3 Drawing Sheets

ELECTRONIC EQUIPMENT SETTING INFORMATION CREATING METHOD AND APPARATUS, AND SECURITY POLICY CREATING METHOD AND ASSOCIATED APPARATUS

BACKGROUND OF THE INVENTION

1. Field of the Invention

The invention relates to creation of setting information of components that constitute an information system. In particular, the invention relates to the technology of creating a security policy written in specific languages of the respective components, based on a security policy that is written in natural language.

2. Description of the Related Art

With the progression of information and communications technology, information security of information systems belonging to specific organizations is assuming importance. In recent years, attention is being given to the significance of security policies in particular.

In the government of Japan, for example, the Cabinet Office for National Security Affairs and Crisis Management issued "Guidelines for Information Technology Security Policy" in July, 2000, and the central government ministries prepared information security policies.

The present inventor has proposed in Japanese Patent Application Nos. 2000-164819 and 2001-132177 apparatuses and methods for creating a security policy by making inquiries to organization members, and grasping the current conditions from the responses.

In these patent applications, the present inventor has proposed to make a security policy in the following three levels:

(1) Executive level policy for describing the concept and plan on information security of an organization;

(2) Corporate level policy for describing standards for the information security system that enforces the executive level policy; and (3) Product level policy for describing the means to implement the plan of the executive level policy based on the standards of the corporate level policy. The security policy is, so to say, a group of rules describing these concept, plan, standards, and means.

Incidentally, as employed in this document, "organizations" refer to not only business enterprises but also other organizations including government and municipal institutions and various incorporations such as foundations.

Now, security policies are the descriptions of the rules as to information security, typically written in natural language. Then, the foregoing three levels of security policies are basically written in natural language.

For example, product level policies describe actual means, and thus include descriptions of the setting information of concrete electronic equipment, software, etc., which are written in human-readable natural language. The setting information of the electronic equipment and software is of no use unless it is actually set to the electronic equipment and software.

In the foregoing applications, two levels of product level policies are hence proposed, i.e., those of a first level written in natural language and a second level written in specific languages of specific devices.

The two types of product level policies, in natural language and in specific languages, define the same contents. One is written in natural language for the sake of human readability. The other is in itself the data for setting specific devices, and thus written in the specific languages of the specific devices. Despite the same contents, it has been required due to the different description languages that the two types of product level policies be created separately.

It would be convenient, however, that the product level policies written in specific languages can be automatically created from those written in natural language, since the contents of the two types are fundamentally the same.

SUMMARY OF THE INVENTION

The present invention has been achieved in view of the foregoing. It is thus an object of the present invention to provide a method and an associated apparatus for automatically creating a security policy written in a specific language of a specific device based on a security policy written in natural language.

To achieve the foregoing object, the present invention provides a setting information creating method for creating setting information of a specific component written in a specific language of the specific component based on a group of rules, the group of rules being setting information of components of an information system written in natural language. The method includes: a language conversion step of converting the group of rules written in natural language into a predetermined interface language; and a creation step of creating the setting information of the specific component based on the group of rules converted into the predetermined interface language.

The present invention also provides a setting information creating apparatus for creating setting information of a specific component written in a specific language of the specific component based on a group of rules, the group of rules being setting information of components of an information system written in natural language. The apparatus includes: language conversion means for converting the group of rules written in natural language into a predetermined interface language; and creation means for creating the setting information of the specific component based on the group of rules converted into the predetermined interface language.

According to these method and apparatus, setting information written in a specific language can be created with efficiency.

The present invention also provides a program for making a computer execute a method for creating setting information of a specific component written in a specific language of the specific component based on a group of rules, the group of rules being setting information of components of an information system written in natural language. The program makes the computer execute: a language conversion procedure for converting the group of rules written in natural language into a predetermined interface language; and a creation procedure for creating the setting information of the specific component based on the group of rules converted into the predetermined interface language.

The present invention also provides a computer-readable recording medium containing a program for executing a method for creating setting information of a specific component written in a specific language of the specific component based on a group of rules, the group of rules being setting information of components of an information system written in natural language. The program executes: a language conversion procedure for converting the group of rules written in natural language into a predetermined interface language; and a creation procedure for creating the setting information of the specific component based on the group of rules converted into the predetermined interface language.

According to these program and recording medium, setting information written in a specific language can be created with efficiency.

Moreover, the present invention provides a security policy creating method for creating a security policy of a predetermined organization, the security policy to be created including a product level policy for describing means to implement a concept and plan on information security of the organization based on a standard for enforcing the concept and plan. The product level policy includes a first level, or setting information of components of an information system of the organization written in natural language, and a second level, or the setting information of a specific component written in a specific language of the specific component. The method includes: a language conversion step of converting the product level policy of the first level into a predetermined interface language; and a creation step of creating the product level policy of the second level based on the product level policy of the first level converted into the predetermined interface language.

The present invention also provides an apparatus for aiding to create a security policy including a product level policy for describing means to implement a concept and plan on information security of a predetermined organization based on a standard for enforcing the concept and plan. The product level policy includes a first level, or setting information of components of an information system of the organization written in natural language, and a second level, or the setting information of a specific component written in a specific language of the specific component. The apparatus includes: language conversion means for converting the product level policy of the first level into a predetermined interface language; and creation means for creating the product level policy of the second level based on the product level policy of the first level converted into the predetermined interface language.

According to these method and apparatus, the product level policy of the second level written in a specific language can be created with efficiency.

The present invention also provides a program for making a computer aid to create a security policy including a product level policy for describing means to implement a concept and plan on information security of a predetermined organization based on a standard for enforcing the concept and plan. The product level policy includes a first level, or setting information of components of an information system of the organization written in natural language, and a second level, or the setting information of a specific component written in a specific language of the specific component. The program makes the computer execute: a language conversion procedure for converting the product level policy of the first level into a predetermined interface language; and a creation procedure for creating the product level policy of the second level based on the product level policy of the first level converted into the predetermined interface language.

The present invention also provides a computer-readable recording medium containing a program for aiding to create a security policy including a product level policy for describing means to implement a concept and plan on information security of a predetermined organization based on a standard for enforcing the concept and plan, the product level policy including a first level, or setting information of components of an information system of the organization, and a second level, or the setting information of a specific component written in a specific language of the specific component. The program executes: a language conversion procedure for converting the product level policy of the first level into a predetermined interface language; and a creation procedure for creating the product level policy of the second level based on the product level policy of the first level converted into the predetermined interface language.

According to these program and recording medium, the product level policy of the second level written in a specific language can be created with efficiency.

The present invention further provides the setting information creating method/apparatus, and the program and recoding medium for creating setting information described above, wherein the group of rules written in natural language includes a parameter or a table listing parameters.

DETAILED DESCRIPTION OF THE PREFERRED EMBODIMENT

Hereinafter, an embodiment of the present invention will be described with reference to the drawings.

The present embodiment will illustrate product level policies that describe concrete implementation means. As mentioned above, the product level policies to be illustrated consist of a first level and a second level, which are written in natural language and in the specific languages of specific devices, respectively. Here, the specific devices may be hardware or software. Product level policies of the second level describe the settings of the foregoing specific devices, and are individually created for the respective specific devices. For example, when a new device is installed, a new product level policy of the second level must be tailored to the new device.

The present embodiment will deal with the technique for creating product level policies of the second level from a product level policy of the first level automatically.

As employed in the present embodiment, "specific devices" refer to software/hardware constituting the information system. The "components" in claims also have the same meaning.

Figure 1:
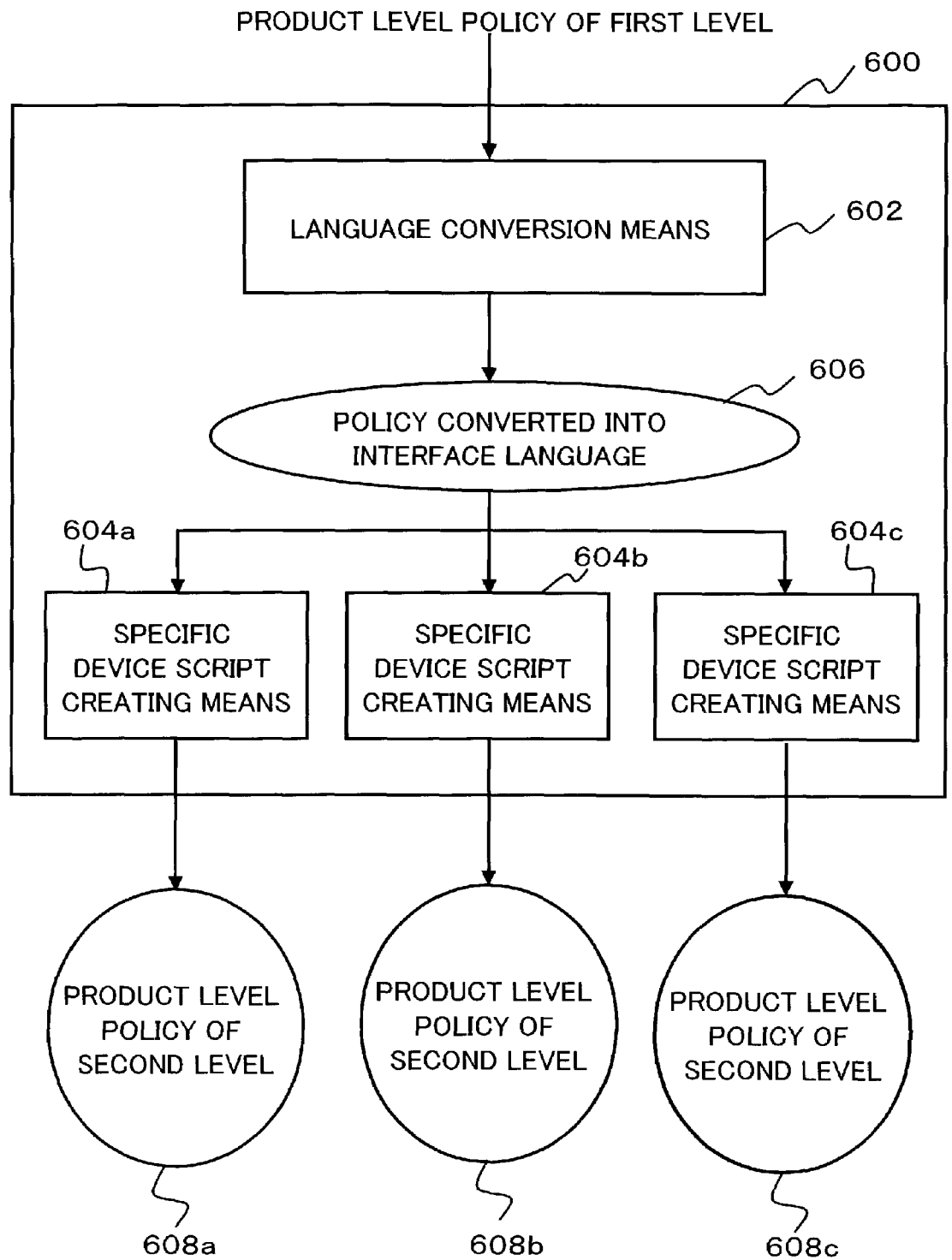
FIG. 1 is a block diagram showing the configuration of a product level policy creating apparatus according to an embodiment.

FIG. 1 is a block diagram showing the configuration of a product level policy creating apparatus 600 according to the present embodiment. As shown in the diagram, the product level policy creating apparatus 600 includes language conversion means 602, first specific device script creating means 604a, second specific device script creating means 604b, and third specific device script creating means 604c.

The present embodiment is characterized in that an interface language interpretable to the individual specific device script creating means 604 is defined. Since such an interface language is defined, the specific device script creating means 604 can interpret the policy written in this language to create scripts for the respective specific devices.

In other words, defining such a language is synonymous with defining an API (Application Programming Interface).

The language conversion means 602 is supplied with a product level policy of the first level which is written in natural language. The language conversion means 602 converts this product level policy of the first level into the foregoing interface language. Incidentally, the language conversion means 602 is preferably implemented by a program for performing language conversion.

In the present embodiment, the product level policy of the first level is shown as written in natural language. Nevertheless, this product level policy may contain tables and the like that describe various parameters, aside from the natural language.

Then, the product level policy converted into the interface language is supplied to the specific device script creating means 604a, 604b, and 604c.

The specific device script creating means 604a, 604b, and 604c creates product level policies of the second level for the corresponding specific devices (including hardware and software as well), respectively. For example, the first specific device script creating means 604a creates a product level policy of the second level 608a for a router. The second specific device script creating means 604b creates a product level policy of the second level 608b for a firewall. The third specific device script creating means 604c creates a product level policy of the second level 608c for an encryption program.

These specific device script creating means 604a, 604b, and 604c are desirably made of programs so-called plug-in modules. Creating a plug-in module with respect to each specific device facilitates creating the product level policies of the second level 608a, 608b, and 608c for the respective specific devices.

The present embodiment is characterized in that the product level policy of the first level is once converted into the interface language.

As mentioned above, the interface language being defined means nothing else that an API is defined between the foregoing plug-in modules and the input data to be supplied to the plug-in modules.

The presence of this API thus facilitates designing the individual plug-in modules, or the specific device script creating means 604a, 604b, and 604c.

In other words, the product level policy of the first level, written in natural language of indefinite form, is converted into the API-based interface language of definite form. Consequently, the developers of the respective specific devices can design the plug-in modules easily based on the API defined.

It follows that the product level policies of the second level 608a, 608b, and 608c corresponding to the respective specific devices can be created easily based on the product level policy of the first level.

If such an API were not adopted, the users would have to read the product level policy of the first level (in natural language), understand the contents, and create the setting scripts, or the product level policies of the second level 608a, 608b, and 608c, based on the technical specifications of the specific devices. This would require extremely intricate operations. The product level policy of the first level, as employed herein, can sometimes contain parameter-listing tables and the like. Moreover, the creation of the product level policies of the second level might possibly require much time, making it difficult to introduce new devices speedily.

In contrast, according to the present embodiment, the specifications of the predetermined interface language are defined to provide the API. The developers of the specific devices can thus design the plug-in modules with facility. As a result, the product level policies of the second level 608a, 608b, and 608c can be created easily by using the plug-in modules. Consequently, it becomes possible to introduce the specific devices speedily.

Figure 2:
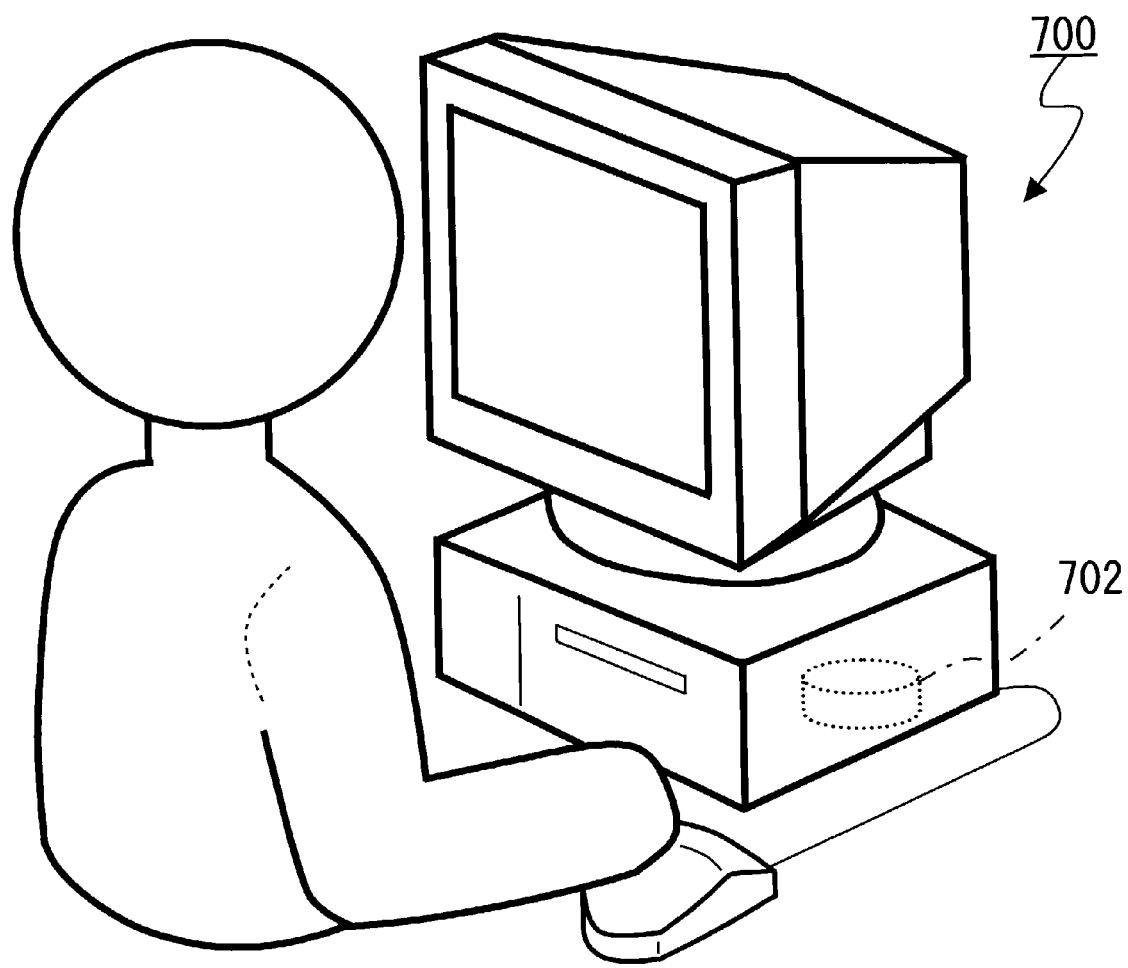
FIG. 2 is a conceptual diagram showing the components of the product level policy creating apparatus of the present embodiment, or programs and a computer on which the programs run.

As has been described, the language conversion means 602 and the specific device script creating means 604 are preferably constituted by programs and a computer on which the programs run. FIG. 2 is a conceptual diagram showing such a computer 700. As shown in this FIG. 2, the individual programs mentioned above are stored in storing means 702. The computer 700 executes the various programs to function as the security policy creating apparatus 600 shown in FIG. 1.

Figure 3:
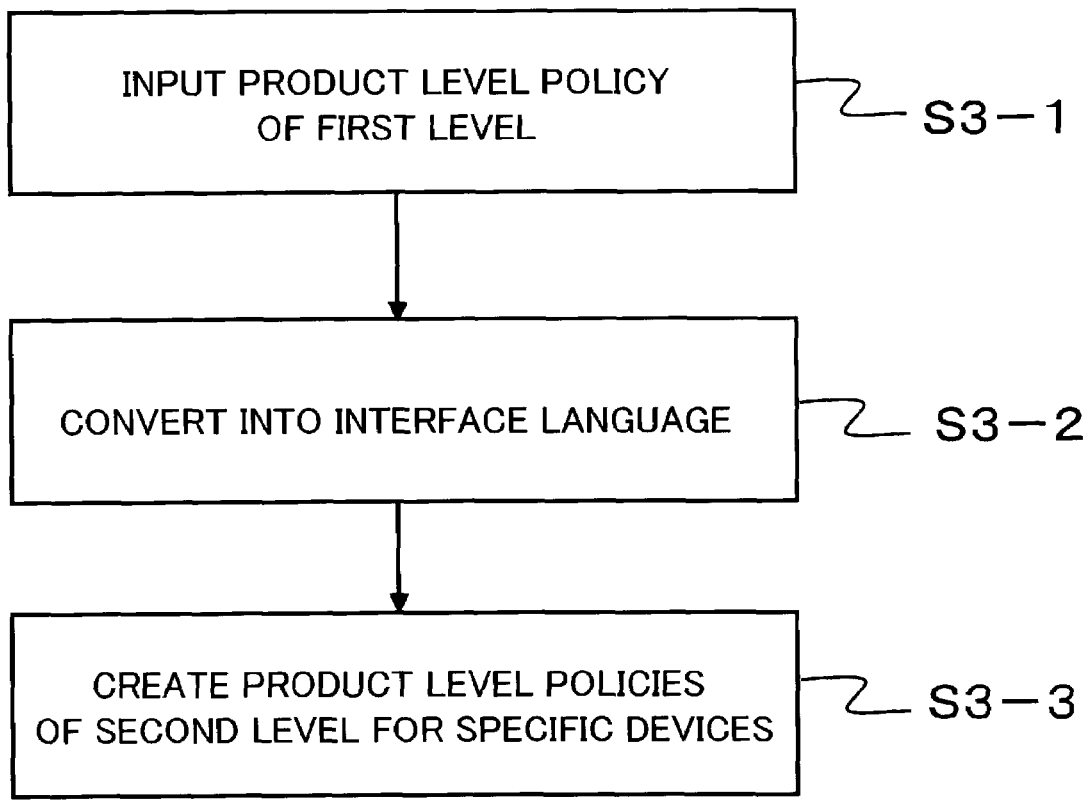
FIG. 3 is a flowchart showing the operation of the product level policy creating apparatus of the present embodiment.

FIG. 3 is a flowchart showing the operation of the product level policy creating apparatus 600.

As shown in the chart, at step S3-1, a product level policy of the first level is initially supplied to the product level policy creating means 600. Needless to say, this product level policy of the first level may contain parameter-listing tables etc.

At step S3-2, the language conversion means 602 converts the product level policy of the first level supplied into a predetermined interface language.

Finally, at step S3-3, the specific device script creating means 604a, 604b, and 604c create product level policies of the second level for the corresponding devices, respectively, based on the product level policy of the first level (606) converted into the foregoing interface language. In this way, the product level policies of the second level for the respective specific devices can be created easily.

While the present embodiment has dealt with security policies, the present invention may be applied to a wide range of uses where setting information of specific devices written in respective specific languages thereof is created from setting information of the specific devices written in natural language.

As has been described, the present embodiment proposes the technique of providing the API so that the product level policies of the second level are automatically created from the product level policy of the first level.

Consequently, because of the provision of the API, the plug-in modules for converting the interface language into the product level policies of the second level can be created easily. This facilitates creating the product level policies of the second level for the respective specific device, allowing speedy modifications etc. to the configuration of the information security system.

As has been described, according to the present invention, setting information of components written in the languages of the respective components can be effectively created from setting information in natural language.

What is claimed is:

1. A setting information creating method for creating setting information for a plurality of different specific components, said setting information written in a specific language of said specific component based on a group of rules, said group of rules being setting information of components of an information system written in natural language, the method comprising:

a language conversion step of converting said group of rules written in natural language into a predetermined interface language, thereby defining an application programming interface that is interpretable by said plurality of different specific components; and a creation step of creating said setting information of said specific component based on said group of rules converted into said predetermined interface language, wherein said different components include a plurality of hardware and software comprising the information system and said application programming interface is supplied to each of the hardware and software.

2. The setting information creating method according to claim 1, wherein
said group of rules written in natural language includes a parameter or a table listing parameters.

3. A setting information creating apparatus for creating setting information for a plurality of different specific components, said setting information written in a specific language of said specific component based on a group of rules, said group of rules being setting information of components of an information system written in natural language, the apparatus comprising:
language conversion means for converting said group of rules written in natural language into a predetermined interface language, thereby defining an application programming interface that is interpretable by said plurality of different specific components; and
creation means for creating said setting information of said specific component based on said group of rules converted into said predetermined interface language, wherein said different components include a plurality of hardware and software comprising the information system and said application programming interface is supplied to each of the hardware and software.

4. The setting information creating apparatus according to claim 3, wherein
said group of rules written in natural language includes a parameter or a table listing parameters.

5. A computer-readable recording medium containing a program for executing a method for creating setting information for a plurality of different specific components, said setting information written in a specific language of said specific component based on a group of rules, said group of rules being setting information of components of an information system written in natural language, said program executing;
a language conversion procedure for converting said group of rules written in natural language into a predetermined interface language, thereby defining an application programming interface that is interpretable by said plurality of different specific components; and
a creation procedure for creating said setting information of said specific component based on said group of rules converted into said predetermined interface language.

6. The computer-readable recording medium according to claim 5, wherein
said group of rules written in natural language includes a parameter or a table listing parameters.

7. A security policy creating method for creating a security policy of a predetermined organization,
said security policy to be created including a product level policy for describing means to implement a concept and plan on information security of said organization based on a standard for enforcing the concept and plan,
said product level policy including a first level, or setting information of components of an information system of said organization written in natural language, and a second level, or said setting information of a specific component written in a specific language of said specific component,
the method comprising:
a language conversion step of converting said product level policy of said first level into a predetermined interface language, thereby defining an application programming interface that is interpretable by a plurality of different specific components; and
a creation step of creating said product level policy of said second level based on said product level policy of said first level converted into said predetermined interface language, wherein said different components include a plurality of hardware and software comprising the information system and said application programming interface is supplied to each of the hardware and software.

8. An apparatus for aiding to create a security policy including a product level policy for describing means to implement a concept and plan on information security of a predetermined organization based on a standard for enforcing the concept and plan,
said product level policy including a first level, or setting information of components of an information system of said organization written in natural language, and a second level, or said setting information of a specific component written in a specific language of said specific component,
the apparatus comprising;
language conversion means for converting said product level policy of said first level into a predetermined interface language, thereby defining an application programming interface that is interpretable by a plurality of different specific components; and
creation means for creating said product level policy of said second level based on said product level policy of said first level converted into said predetermined interface language, wherein said different components include a plurality of hardware and software comprising the information system and said application programming interface is supplied to each of the hardware and software.

9. A computer-readable recording medium containing a program for aiding to create a security policy including a product level policy for describing means to implement a concept and plan on information security of a predetermined organization based on a standard for enforcing the concept and plan,
said product level policy including a first level, or setting information of components of an information system of said organization written in natural language, and a second level, or said setting information of a specific component written in a specific language of said specific component,
said program executing:
a language conversion procedure for converting said product level policy of said first level into a predetermined interface language, thereby defining an application programming interface that is interpretable by a plurality of different specific components; and
a creation procedure for creating said product level policy of said second level based on said product level policy of said first level converted into said predetermined interface language, wherein said different components include a plurality of hardware and software comprising the information system and said application programming interface is supplied to each of the hardware and software.

* * * * *